(12) United States Patent
Hong (10) Patent No.: US 9,193,229 B2
(45) Date of Patent: Nov. 24, 2015

(54) TIRE REPAIR DEVICE (71) Applicant: Top Alliance Technology Limited, Tortola (VG)

(72) Inventor: David Ying Chi Hong, Causeway Bay (HK)

(73) Assignee: Top Alliance Technology Limited, Tortola (VG)

( * ) Notice: Subject to any disclaimer, the term of this patent is extended or adjusted under 35 U.S.C. 154(b) by 178 days.

(21) Appl. No.: 14/095,023

(22) Filed: Dec. 3, 2013

(65) Prior Publication Data

US 2015/0151594 A1 Jun. 4, 2015

(51) Int. Cl.
*B29C 73/16* (2006.01)
*B60C 25/00* (2006.01)

(52) U.S. Cl.
CPC ............... *B60C 25/16* (2013.01); *B29C 73/166* (2013.01)

(58) Field of Classification Search
CPC .............................. B60C 25/16; B29C 73/166
USPC ............................................. 141/38; 152/415
See application file for complete search history.

(56) References Cited

U.S. PATENT DOCUMENTS

| 5,765,601 | A * | 6/1998 | Wells et al. | 141/38 |
| 6,668,875 | B2 * | 12/2003 | Kojima et al. | 141/38 |
| 7,178,564 | B2 * | 2/2007 | Kojima et al. | 141/38 |
| 7,389,800 | B2 * | 6/2008 | Hickman et al. | 141/38 |
| 7,748,295 | B2 * | 7/2010 | Hong | 141/38 |
| 7,854,242 | B2 * | 12/2010 | Stehle | 141/38 |
| 8,205,645 | B2 * | 6/2012 | Dowel | 141/38 |
| 8,302,636 | B2 * | 11/2012 | Sekiguchi | 141/38 |
| 8,336,581 | B2 * | 12/2012 | Lolli et al. | 141/38 |
| 8,342,215 | B2 * | 1/2013 | Sekiguchi | 141/38 |
| 8,517,063 | B2 * | 8/2013 | Kanenari et al. | 141/38 |
| 8,746,293 | B2 * | 6/2014 | Chou | 141/38 |
| 9,050,866 | B2 * | 6/2015 | Hong | 1/1 |
| 2003/0024596 | A1 * | 2/2003 | Kojima et al. | 141/38 |
| 2005/0284536 | A1 * | 12/2005 | Kojima et al. | 141/38 |
| 2006/0217662 | A1 * | 9/2006 | Hickman et al. | 604/153 |
| 2007/0181209 | A1 * | 8/2007 | Stehle | 141/38 |
| 2008/0257448 | A1 * | 10/2008 | Hickman et al. | 141/26 |
| 2008/0264540 | A1 * | 10/2008 | Dowel | 141/67 |
| 2009/0107578 | A1 * | 4/2009 | Trachtenberg et al. | 141/5 |
| 2009/0277534 | A1 * | 11/2009 | Yoshida et al. | 141/38 |
| 2011/0192492 | A1 * | 8/2011 | Kanenari et al. | 141/38 |
| 2014/0103006 | A1 * | 4/2014 | Hong | 215/316 |
| 2014/0283949 | A1 * | 9/2014 | Hong | 141/52 |
| 2015/0059921 | A1 * | 3/2015 | Jhou | 141/38 |

\* cited by examiner

*Primary Examiner* — Nicolas A Arnett
(74) *Attorney, Agent, or Firm* — Raymond R. Ferrera; Adams and Reese LLP (57) ABSTRACT

A tire repair device comprises a bottle body for containing tire sealant and a bottle cap deposited at an opening of the bottle body to seal the bottle body; wherein the tire repair device further comprises a tire sealant guiding tube provided in the bottle cap, and the tire sealant guiding tube includes a first tube section extending into the bottle body and a second tube section; a flange is formed on an internal surface of the first tube section; a plug is slidably placed in the first tube section; at least one rib is fixed in the first tube section and is deposited between the flange and the first bottom end. The tire repair device of the present application has a simple structure, is easy to operate, and is cost-effective; besides, the tire repair device can be used either upright or upside-down, which is good for promotion and implementation.

9 Claims, 6 Drawing Sheets

TIRE REPAIR DEVICE

FIELD OF THE INVENTION

The present application relates to tire repair tools, and more particularly relates to a tire repair device.

BACKGROUND OF THE INVENTION

Currently, tire repair devices on sale in the market can normally provide preventative functions, including automotive tire repairing and leakage proof. However, a spray-type tire sealant is usually adopted in the tire repair device in the prior art. In this case, a spray nozzle of a tire repair sprayer will be connected to a gas filling nozzle configured on the tire; by pressing the sprayer, the tire sealant can be injected into the tire. During operation process, human fingers are required to press the tire repair sprayer to make it work. Due to insufficient strength of human fingers applied to the sprayer in the pressing process, the tire sealant injected into the tire is not much enough. In that way, effective tire repairing cannot be obtained. Moreover, the tire repair sprayer cannot work when placed upside down. That is, if the gas filling nozzle is reversed to the direction of the tire repair sprayer normally placed, the tire repairing cannot be achieved.

SUMMARY OF THE INVENTION

The objective of the present application is to provide a tire repair device which has a simple structure and is easy to operate, aiming at the defect that the tire repair device in the prior art is not easy to operate.

The technical solutions of the present application for solving the technical problems are as follows:

In one aspect, the present application provides a tire repair device, comprising a bottle body for containing tire sealant and a bottle cap formed at an opening of the bottle body to seal the bottle body; a tire sealant guiding tube is provided in the bottle cap, and the tire sealant guiding tube includes a first tube section extending into the bottle body and a second tube section; one end of the first tube section defines a first inlet configured to allow the tire sealant in the bottle body to enter the first tube section, and the other end of the first tube section is a sealed first bottom end; one end of the second tube section defines a second inlet configured to allow the tire sealant in the first tube section to enter the second tube section, and the other end of the second tube section is a second bottom end; the second bottom end of the second tube section is connected to one end of a fluid transfer tube; a connector is arranged on the other end of the fluid transfer tube, and is configured for connecting to a damaged tire to lead the tire sealant in the bottle body into the damaged tire; the second inlet is located between the first inlet of the first tube section and the first bottom end of the first tube section; a flange is formed on an internal surface of the first tube section, and the internal surface is located between the first inlet of the first tube section and the second inlet of the second tube section; a plug is slidably placed in the first tube section; at least one rib is fixed in the first tube section and is deposited between the flange and the first bottom end.

In one embodiment, a through-hole running through the bottle cap and the first bottom end of the first tube section to communicate with the first tube section is defined in the bottle cap, and an internal diameter of the through-hole is smaller than an internal diameter of a second portion of the first tube section, the second portion is located between the flange and the first bottom end.

In another embodiment, an internal diameter of the flange is smaller than an internal diameter of a first portion of the first tube section which the first portion is located between the first inlet and the flange; and the internal diameter of the first portion of the first tube section is smaller than the internal diameter of the second portion of the first tube section.

In another embodiment, a first retaining ring is arranged at a connection point between the second tube section and the fluid transfer tube, and a second retaining ring is arranged at a connection point between the fluid transfer tube and the connector.

In another embodiment, an air intake is defined in the bottle body to connect to an air compressor and to apply compressed air into the bottle body.

In another embodiment, a sealing pad is arranged between the tire sealant guiding tube and an internal surface of the bottle cap to prevent the tire sealant from flowing out.

In another embodiment, a neck tube is provided at the opening of the bottle body, and an external thread is formed on an external surface of the necking tube; and a chamber is formed in the bottle cap, and an internal thread adapted to the external thread on the neck tube is applied on an side wall of the chamber; the neck tube of the bottle body is inserted into the chamber by the threaded connection between the external thread of the neck tube and the internal thread of the chamber; the first tube section is inserted into the chamber, and the sealing pad is arranged in the chamber and is positioned between the neck tube and a top portion of the bottle cap; the first bottom end of the first tube section extends to the top portion of the bottle cap, and the second tube section is inserted in the top portion of the bottle cap.

In another embodiment, the connector includes a tire valve adapter which connects to the fluid transfer tube, a protective case covering an external surface of the tire valve adapter and configured for connecting to a tire air nozzle, and a sealing ring arranged at an end of the tire valve adapter to prevent air and tire sealant from leaking.

In another embodiment, the tire valve adapter is screwed with the fluid transfer tube, and an annular protrusion is formed on an external surface of the tire valve adapter; one end of the protective case is fixed on the annular protrusion, and the other end of the protective case forms a thread connected to the tire air nozzle.

The following advantageous effects of the present application can be achieved: by applying the bottle cap with the tire sealant guiding tube, and depositing the flange and the plug within the first tube section of the tire sealant guiding tube, the plug can move in the first tube section under the influence of the air pressure in the bottle body to block or unblock the second inlet according to requirements. When no compressed air is applied into the bottle body, the plug is located between the first inlet of the first tube section and the flange of the first tube section. When air expansion inside the bottle body caused by temperature change occurs, the plug is locked on the flange. When compressed air is applied into the bottle body, the plug is located at a position of the first tube section between the second inlet and the first bottom end, so that the tire sealant flows from the bottle body to a damaged tire via the fluid transfer tube. Thus, the supply of tire sealant to the damaged tire can be achieved by changing the air pressure in the bottle body for tire repairing. Therefore, the tire repair device of the present application has a simple structure, is easy to operate, and is cost-effective; besides, the tire repair device can be used either upright or upside-down, which is good for promotion and implementation.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

Figure 1:
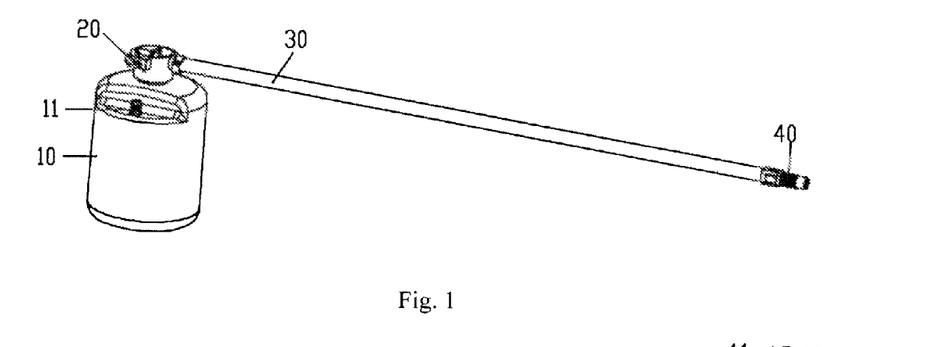
FIG. 1 is a structural schematic view of a tire repair device of a preferred embodiment of the present application.

A structural schematic view of a tire repair device in accordance with a preferred embodiment of the present application is shown in FIG. 1, with more details in FIGS. 2-9. The tire repair device comprises a bottle body 10 for containing tire sealant. A bottle cap 20 is deposited at an opening of the bottle body 10 to seal the bottle body 10; and a tire sealant guiding tube is provided in the bottle cap 20. The tire sealant guiding tube includes a first tube section 21 extending into the bottle body 10, and a second tube section 22. Advantageously, in this embodiment, the second tube section 22 is perpendicular to the first tube section 21.

One end of the first tube section 21 defines a first inlet 211 configured to allow the tire sealant in the bottle body 10 to enter the first tube section 21, and the other end of the first tube section 21 is a sealed first bottom end 212. One end of the second tube section 22 defines a second inlet 221 configured to allow the tire sealant in the first tube section 21 to enter the second tube section 22, and the other end of the second tube section 22 is a second bottom end 222. The second bottom end 222 of the second tube section 22 is connected to one end of a fluid transfer tube 30; a connector 40 is arranged on the other end of the fluid transfer tube 30, and is configured for connecting to a damaged tire to lead the tire sealant in the bottle body 10 into the damaged tire.

The second inlet 221 is located between the first inlet 211 of the first tube section 21 and the first bottom end 212 of the first tube section 21. A flange 25 is formed on an internal surface of the first tube section 21, and the internal surface is located between the first inlet 211 of the first tube section 21 and the second inlet 221 of the second tube section 22. A plug 24 is slidably placed in the first tube section 21. The plug 24 and the internal surface of the first tube section 21 form interference fit. In the embodiment, the flange 25 is annular.

In the embodiment, an external diameter of the plug 24 is slightly larger than the minimum internal diameter of the first tube section 21. Thus, under a low temperature condition, even if the plug 24 is shrinked, the plug 24 will still resist the internal surface of the first tube section 21, and thus the tire sealant cannot be leaked.

Furthermore, an internal diameter of the flange 25 is smaller than an internal diameter of a first portion of the first tube section 21, and the internal diameter of the first portion of the first tube section 21 is further smaller than an internal diameter of a second portion of the first tube section 21; the first portion of the first tube section 21 is located between the first inlet 211 and the flange 25, and the second portion of the first tube section 21 is located between the flange 25 and the first bottom end 212.

In this embodiment, the internal diameter of the first portion of the first tube section 21 is 3.5 mm; the internal diameter of the flange 25 is 3.4 mm; and the internal diameter of the second portion of the first tube section 21 is 3.8 mm.

Figure 6:
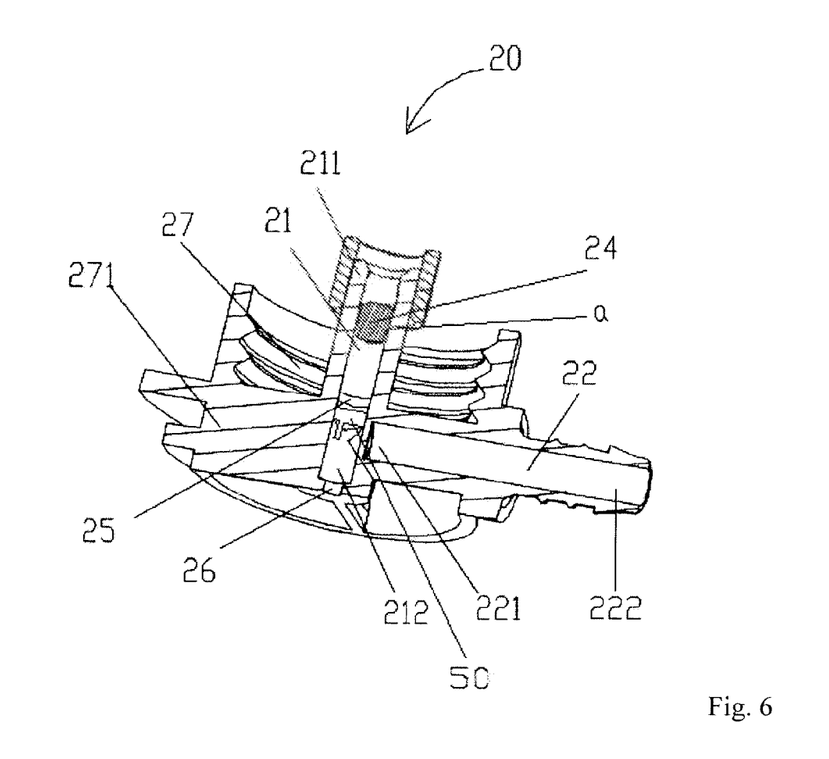
FIG. 6 is a schematic view of position a of a plug in the bottle cap of the tire repair device of the preferred embodiment of the present application, under a normal temperature and pressure condition.

The plug 24 can move within the first tube section 21 with the application of different internal air pressures in the bottle body 10, and thus blocks or unblocks the second inlet 221 of the second tube section 22 based on the requirements. As shown in FIG. 6, under a normal temperature and pressure condition, without applying compressed air into the bottle body 10, the plug 24 will be located between the first inlet 211 of the first tube section 21 and the flange 25, namely position a.

Figure 2:
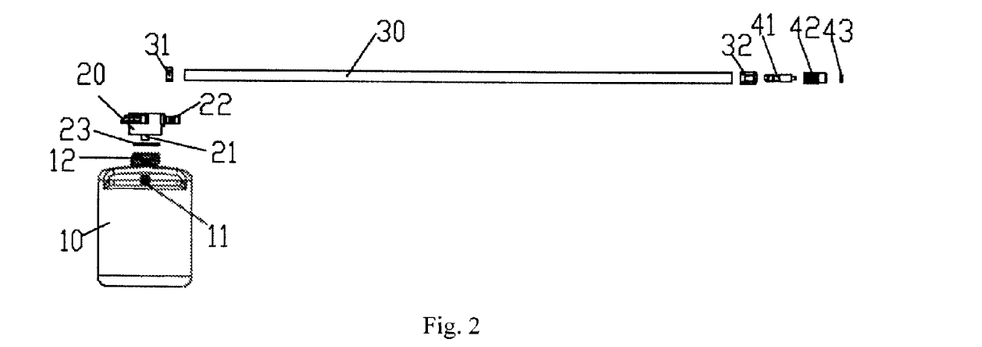
FIG. 2 is an assembly schematic view of the tire repair device of the preferred embodiment of the present application.

As shown in FIG. 2, under a high temperature condition, an air pressure caused by air expansion within the bottle body 10 pushes the plug 24 to move within the first tube section 21 and to be locked on the flange 25, at this time, the first tube section 21 becomes longer and thinner. When the compressed air is applied into the bottle body 10, the air pressure in the bottle body 10 increases rapidly, and the plug 24 moves to a position between the second inlet 221 of the second tube section 22 and the first bottom end 212 of the first tube section 21. At the same time, the tire sealant can flow from the bottle body 10 into the damaged tire via the fluid transfer tube 30, passing through the second inlet 221 of the second tube section 22, and thus forms a process the same as a one-way valve working process. In this way, the supply of the tire sealant to the damaged tire can be achieved by changing the air pressure in the bottle body 10 for tire repairing. Furthermore, the tire repair device has a simple structure, is easy to operate, and is good for promotion and implementation.

Figure 4:
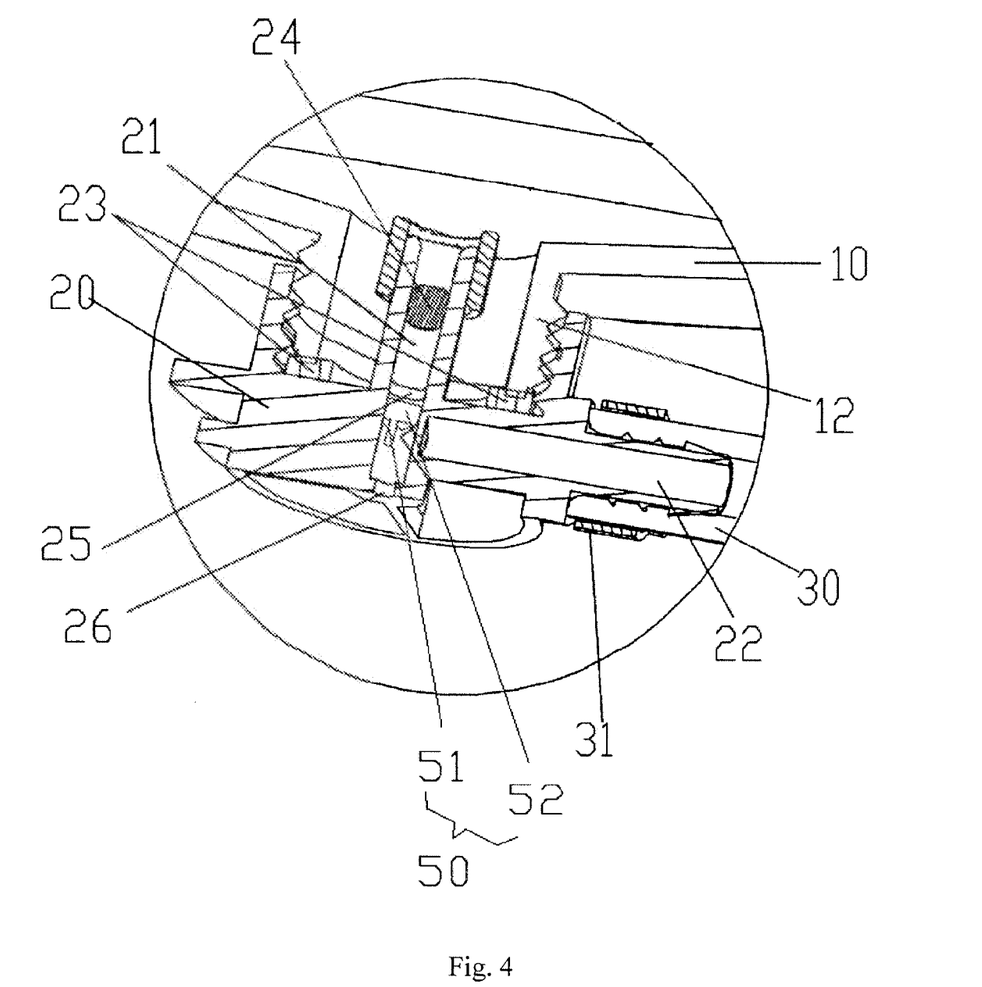
FIG. 4 is an enlarged view of portion A shown in FIG. 3.

In a further embodiment of the present application, as shown in FIG. 4, a through-hole 26 running through the bottle cap 20 and the first bottom end 212 of the first tube section 21 to communicate with the first tube section 21 is defined in the bottle cap 20. An internal diameter of the through-hole 26 is smaller than the internal diameter of the second portion of the first tube section 21 which is located between the flange 25 and the first bottom end 212. Advantageously, in this embodiment, the internal diameter of the through-hole 26 is smaller than 100 μm. Thus, basing on the Young-Laplace equation, under the influence of the capillary pressure, it is not easy for the tire sealant to pass through the through-hole 26. The smaller an internal diameter of a capillary is, the higher a differential pressure between the interfaces of the capillary is, so that the tire sealant cannot leak when the tire repair device is used.

Figure 8:
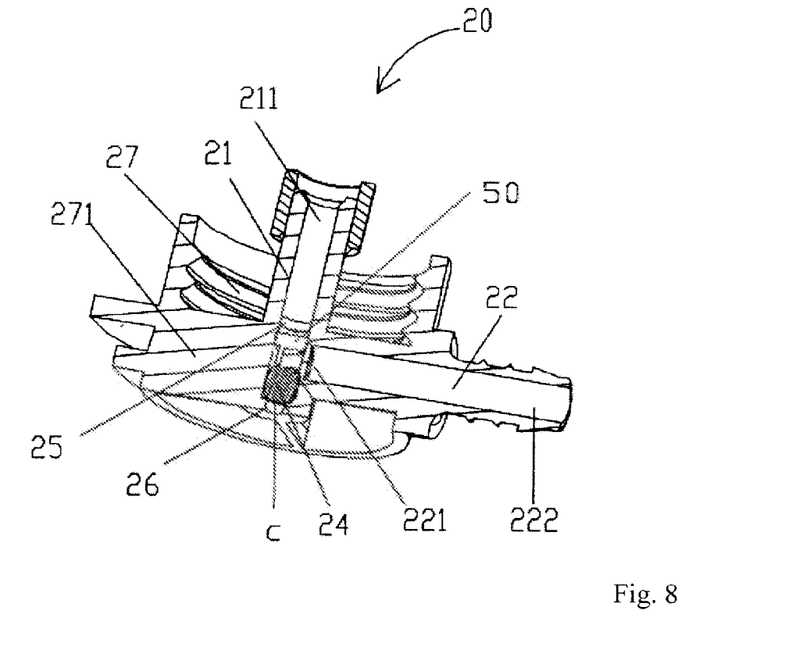
FIG. 8 is a schematic view of position c of the plug in the bottle cap of the tire repair device of the preferred embodiment of the present application, when compressed air is applied into the bottle body.

When the plug 24 moves to a position between the second inlet 221 of the second tube section 22 and the first bottom end 212 of the first tube section 21, namely position c shown in FIG. 8, the air between the second inlet 221 of the second tube section 22 and the first bottom end 212 of the first tube section 21 can flow out via the through-hole 26. Moreover, the plug 24 will not block the second inlet 221 of the second tube section 22, so that the second inlet 221 of the second tube section 22 can communicate with the bottle body 10. Thus, under the influence of atmospheric pressure, the tire sealant cannot flow out completely.

It can be understood that there can be no through-hole 26 defined in the bottle cap 20; thereby, the space of the first tube section 21 between the second inlet 221 and the first bottom end 212 should be large enough. Thus, when the plug 24 moves to a position between the second inlet 221 and the first bottom end 212, the plug 24 will not encounter more resistance.

Furthermore, in order to avoid the occasion that when the plug 24 moves to the first bottom end 212, the plug 24 enters into the second tube section 22 accidentally or blocks the second inlet 221 partly, at least one rib 50 is fixed in the first tube section 21 and is deposited between the flange 25 and the first bottom end 212. The rib 50 includes a rib body 51 abutting against the plug 24 and a resisting portion 52 resisting with the internal surface of the first tube section 21. Preferably, the rib 50 is fixed in the first tube section 21 with its rib body 51 positioned between the bottom of the second tube section 22 and the flange 25. When the plug 24 passes the rib 50, the rib body 51 of the rib 50 will abut against the plug 24 to prevent the plug 24 from entering into the second tube section 22, or blocking the second inlet 221 partly.

In a further embodiment of the present application, as shown in FIG. 2, a first retaining ring 31 is arranged at a connection point between the second tube section 22 and the fluid transfer tube 30, to fasten the second tube section 22 and the fluid transfer tube 30, so as to avoid the air and tire sealant leakage during the tire repairing process. A second retaining ring 32 is arranged at a connection point between the fluid transfer tube 30 and the connector 40, and is likewise to avoid the air and tire sealant leakage during the tire repairing process. The first retaining ring 31 and the second retaining ring 32 can be hoop structures with tightness adjusted by bolts.

Furthermore, as shown in FIG. 1 and FIG. 2, an air intake 11 is defined in the bottle body 10 to connect to an air compressor (not shown here); and in this way, the compressed air can be applied into the bottle body 10. Preferably, the air intake 11 is arranged near the opening of the bottle body 10 for the convenience of connecting the bottle body 10 to the air compressor.

Figure 3:
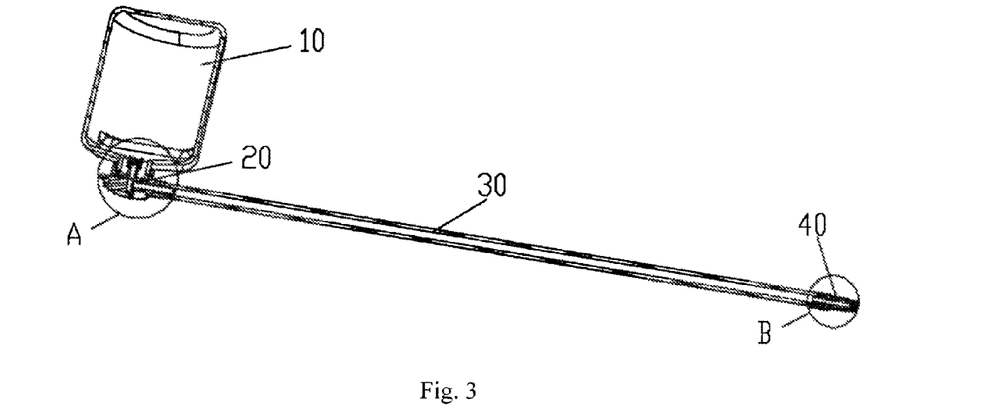
FIG. 3 is an overall cut-away view of the tire repair device of the preferred embodiment of the present application.

In a further embodiment of the present application, as shown in FIGS. 3 and 4, a sealing pad 23 is arranged between the tire sealant guiding tube and an internal surface of the bottle cap 20, which prevents the tire sealant from flowing out via a gap between the bottle body 10 and the bottle cap 20.

Figure 9:
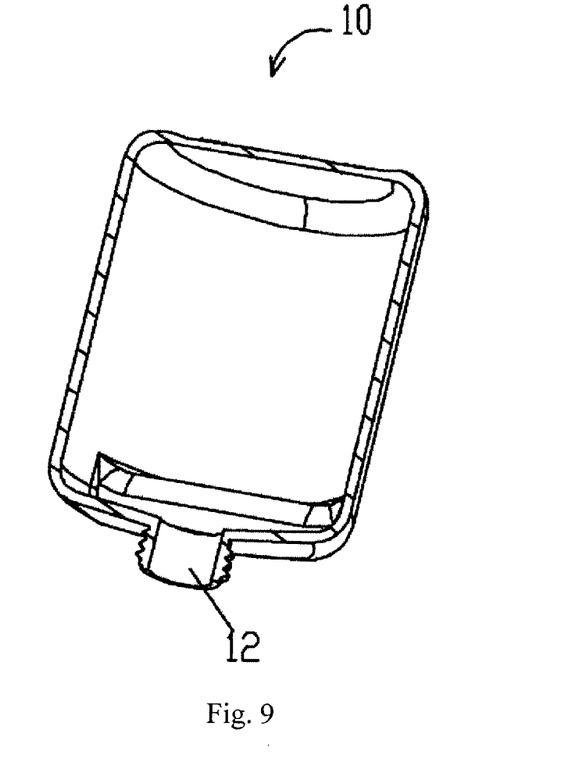
FIG. 9 is a cut-away view of the bottle body of the tire repair device of the preferred embodiment of the present application.
Figure 10A:
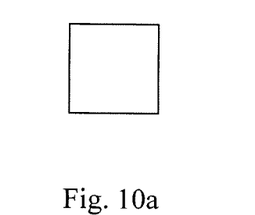
FIG. 10a is a schematic view of a plug of a first embodiment of the present application.
Figure 10B:
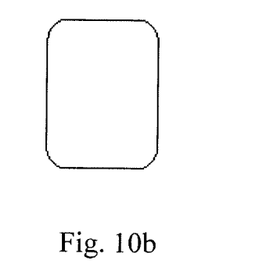
FIG. 10b is a schematic view of a plug of a second embodiment of the present application.
Figure 10C:
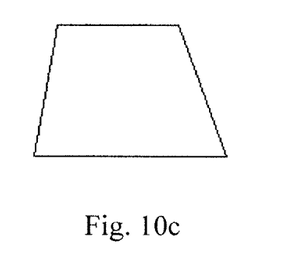
FIG. 10c is a schematic view of a plug of a third embodiment of the present application.
Figure 10D:
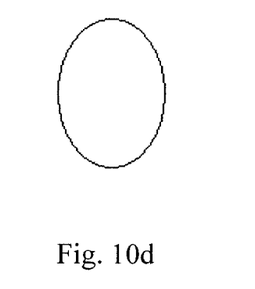
FIG. 10d is a schematic view of a plug of a fourth embodiment of the present application.
Figure 10E:
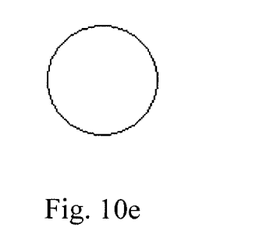
FIG. 10e is a schematic view of a plug of a fifth embodiment of the present application.
Figure 10F:
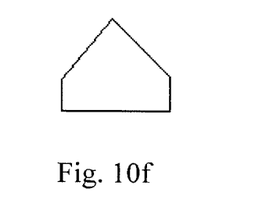
FIG. 10f is a schematic view of a plug of a sixth embodiment of the present application.

Specifically, as shown in FIGS. 4, 6 and 9, a neck tube 12 is provided at the opening of the bottle body 10, and an external thread is formed on an external surface of the neck tube 12. Additionally, a chamber 27 is formed in the bottle cap 20, and an internal thread adapted to the external thread on the neck tube 12 is applied on a side wall of the chamber 27. The neck tube 12 of the bottle body 10 is inserted into the chamber 27 by the threaded connection between the external thread of the neck tube 12 and the internal thread of the chamber 27. The first tube section 21 is inserted into the chamber 27, and the sealing pad 23 is arranged in the chamber 27 and is positioned between the neck tube 12 and a top portion 271 of the bottle cap 20. Moreover, the sealing pad 23 is pressed tightly by the neck tube 12. The first bottom end 212 of the first tube section 21 extends to the top portion 271 of the bottle cap 20, and communicates with the through-hole 26 located at the top portion 271 of the bottle cap 20, and the second tube section 22 is inserted into the top portion 271 of the bottle cap 20.

Figure 7:
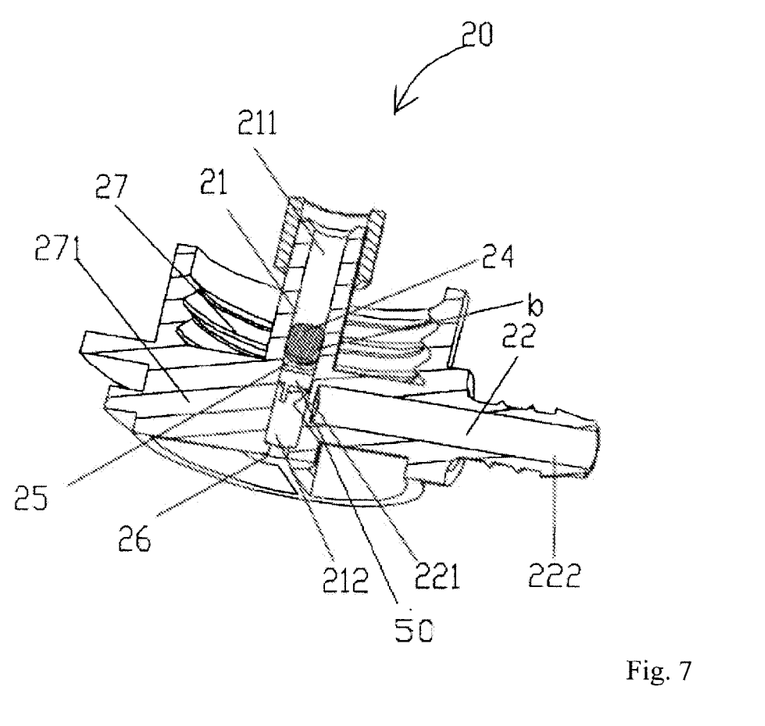
FIG. 7 is a schematic view of position b of the plug in the bottle cap of the tire repair device of the preferred embodiment of the present application, under a high temperature condition.

Preferably, as shown in FIGS. 6, 7 and 8, the bottle cap 20 is an integrated element. During the assembling process, it is only required that the sealing pad 23 is mounted in the chamber 27 of the bottle cap 20, and the bottle cap 20 is screwed down at the neck tube 12 of the bottle body 10, and then the fluid transfer tube 30 is tightly locked at the second bottom end 222 of the second tube section 22.

Figure 5:
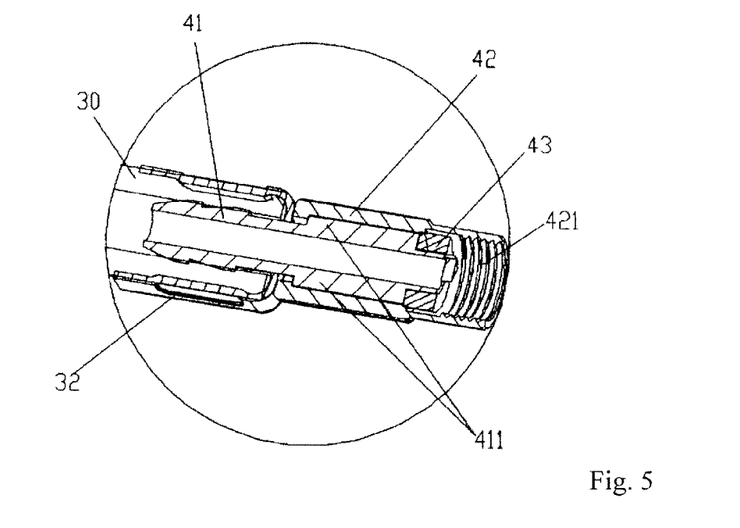
FIG. 5 is an enlarged view of portion B shown in FIG. 3.

In a further embodiment of the present application, as shown in FIGS. 2 and 5, the connector 40 includes a tire valve adapter 41 which connects to the fluid transfer tube 30, and the tire valve adapter 41 can open a tire air nozzle, to make the tire, the fluid transfer tube 30, the bottle cap 20 and the bottle body 10 a communication system, for the convenience of tire sealant applying and tire repairing. The connector 40 further includes a protective case 42 and a sealing ring 43; the protective case 42 covers an external surface of the tire valve adapter 41 and is configured for connecting to the tire air nozzle; the sealing ring 43 is arranged at an end of the tire valve adapter 41 to prevent air and tire sealant from leaking.

Specifically, as shown in FIG. 5, the tire valve adapter 41 is screwed with the fluid transfer tube 30, and an annular protrusion 411 is formed on the external surface of the tire valve adapter 41. One end of the protective case 42 is fixed on the annular protrusion 411, and the other end of the protective case 42 forms a thread 421 connected to the tire air nozzle.

In the above embodiment of the present application, the preferred volume of the bottle body 10 is 450 ml, which is fit for a mid-size sedan or a smaller one. The plug 24 in the first tube section 21 is made of rubber material, which is satisfied with the air expansion in the bottle body 10 at a temperature range of −40~80° C. It can be understood that the plug 24 can be made of silicone rubber, latex rubber, resin, epoxy resin or other polymer. Compared with other materials, these materials have certain elasticity, low thermal expansion and low thermal shrinkage. As shown in FIGS. 10a-10f, the plug 24 can be in the shape of cubic, rectangular, prismatic, oval, spherical, or coned, etc. Of course, the shape of the plug 24 is not limited to the above shapes.

During tire repairing process, the air compressor is connected to the bottle body 10, and the fluid transfer tube 30 is connected to the tire to be repaired respectively. When the air compressor is activated, compressed air generated by the air compressor pushes the plug 24 in the bottle body 10 to move from the position a or the position b to the position c, and then the tire sealant in the bottle body 10 flows into the tire. The air compressor keeps generating compressed air to make the air pressure in the tire reach a standard air pressure, and then the car moves forward slowly to make the tire sealant cover the internal surface of the damaged tire so as to repair the damaged tire. The tire repair device of the present application has a simple structure, is easy to operate, and is cost-effective; besides, the tire repair device can be used either upright or upside-down, which is good for promotion and implementation.

While the embodiments of the present application are described with reference to the accompanying drawings above, the present application is not limited to the above-mentioned specific implementations. In fact, the above-mentioned specific implementations are intended to be exemplary not to be limiting. In the inspiration of the present application, those ordinary skills in the art can also make many modifications without breaking away from the subject of the present application and the protection scope of the claims. All these modifications belong to the protection of the present application.

The invention claimed is:

1. A tire repair device, comprising a bottle body for containing tire sealant and a bottle cap deposited at an opening of the bottle body to seal the bottle body, wherein, a tire sealant guiding tube is provided in the bottle cap, and the tire sealant guiding tube includes a first tube section extending into the bottle body and a second tube section;

one end of the first tube section defines a first inlet configured to allow the tire sealant in the bottle body to enter the first tube section, and the other end of the first tube section is a sealed first bottom end; one end of the second tube section defines a second inlet configured to allow the tire sealant in the first tube section to enter the second tube section, and the other end of the second tube section is a second bottom end; the second bottom end of the second tube section is connected to one end of a fluid transfer tube; a connector is arranged on the other end of the fluid transfer tube, and is configured for connecting to a damaged tire to lead the tire sealant in the bottle body into the damaged tire;

the second inlet is located between the first inlet of the first tube section and the first bottom end of the first tube section;

a flange is formed on an internal surface of the first tube section, and the internal surface is located between the first inlet of the first tube section and the second inlet of the second tube section; a plug is slidably placed in the first tube section;

at least one rib is fixed in the first tube section and is deposited between the flange and the first bottom end.

2. The tire repair device according to claim 1, wherein, a through-hole running through the bottle cap and the first bottom end of the first tube section to communicate with the first tube section is defined in the bottle cap, and an internal diameter of the through-hole is smaller than an internal diameter of a second portion of the first tube section, the second portion is located between the flange and the first bottom end.

3. The tire repair device according to claim 2, wherein, an internal diameter of the flange is smaller than an internal diameter of a first portion of the first tube section which the first portion is located between the first inlet and the flange; and the internal diameter of the first portion of the first tube section is smaller than the internal diameter of the second portion of the first tube section.

4. The tire repair device according to claim 1, wherein, a first retaining ring is arranged at a connection point between the second tube section and the fluid transfer tube, and a second retaining ring is arranged at a connection point between the fluid transfer tube and the connector.

5. The tire repair device according to claim 1, wherein, an air intake is defined in the bottle body to connect to an air compressor and to apply compressed air into the bottle body.

6. The tire repair device according to claim 1, wherein, a sealing pad is arranged between the tire sealant guiding tube and an internal surface of the bottle cap to prevent the tire sealant from flowing out.

7. The tire repair device according to claim 6, wherein, a neck tube is provided at the opening of the bottle body, and an external thread is formed on an external surface of the necking tube; and a chamber is formed in the bottle cap, and an internal thread adapted to the external thread on the neck tube is applied on an side wall of the chamber; the neck tube of the bottle body is inserted into the chamber by the threaded connection between the external thread of the neck tube and the internal thread of the chamber;

the first tube section is inserted into the chamber, and the sealing pad is arranged in the chamber and is positioned between the neck tube and a top portion of the bottle cap; the first bottom end of the first tube section extends to the top portion of the bottle cap, and the second tube section is inserted in the top portion of the bottle cap.

8. The tire repair device according to claim 1, wherein, the connector includes a tire valve adapter which connects to the fluid transfer tube, a protective case covering an external surface of the tire valve adapter and configured for connecting to a tire air nozzle, and a sealing ring arranged at an end of the tire valve adapter to prevent air and tire sealant from leaking.

9. The tire repair device according to claim 8, wherein, the tire valve adapter is screwed with the fluid transfer tube, and an annular protrusion is formed on an external surface of the tire valve adapter;

one end of the protective case is fixed on the annular protrusion, and the other end of the protective case forms a thread connected to the tire air nozzle.

\* \* \* \* \*